United States Patent [19]
Sugiyama

[11] Patent Number: 5,661,845
[45] Date of Patent: Aug. 26, 1997

[54] MOVING IMAGE RECORDING AND REPRODUCING APPARATUS

[75] Inventor: Kenji Sugiyama, Yokosuka, Japan

[73] Assignee: Victor Company of Japan, Ltd., Yokohami, Japan

[21] Appl. No.: 449,509

[22] Filed: May 23, 1995

[30] Foreign Application Priority Data

May 24, 1994 [JP] Japan .................................. 6-133643
Dec. 8, 1994 [JP] Japan .................................. 6-331230

[51] Int. Cl.$^6$ .............................. H04N 5/91; H04N 7/26
[52] U.S. Cl. .............................. 386/68; 386/109
[58] Field of Search ................... 358/335, 312; 360/10.1, 10.3; 386/109

[56] References Cited

U.S. PATENT DOCUMENTS

| | | | |
|---|---|---|---|
| 5,136,391 | 8/1992 | Minami | 358/310 |
| 5,282,049 | 1/1994 | Hatakenaka et al. | 358/335 |
| 5,377,051 | 12/1994 | Lane et al. | 360/33.1 |
| 5,418,623 | 5/1995 | Park | 358/335 |
| 5,434,677 | 7/1995 | Oikawa | 358/335 |
| 5,450,209 | 9/1995 | Niimura et al. | 358/335 |
| 5,532,835 | 7/1996 | Nakagaki et al. | 358/335 |

FOREIGN PATENT DOCUMENTS

| | | |
|---|---|---|
| 0353758 | 8/1989 | European Pat. Off. . |
| 0562845 | 3/1993 | European Pat. Off. . |

OTHER PUBLICATIONS

Jill Boyce and Frank Lane, Fast Scan Technology for Digital Video Tape Recorders, IEEE Transactions on Consumer Electronics, vol. 39, No. 3, pp. 186–191 Aug. 1993.

Je H. Lee et al., A study on New DCT–Based Bit Rate Reduction Algorithm and Variable Speed Playback for a Home–Use Digital VCR, IEEE Transactions on Consumer Electronics, vol. 38, No. 3 Aug. 1992.

Primary Examiner—Tommy P. Chin
Assistant Examiner—LuAnne P. Din
Attorney, Agent, or Firm—Jacobson, Price, Holman & Stern, PLLC

[57] ABSTRACT

High speed image search data is obtained from compression-coded moving image data for each frame/field). The obtained data is divided into ranges based on positions on a picture, and the range is divided based on the amount of codes. The divided data is multiplexed for each position in the picture as data is recorded at different positions on a track and a specific number of different frames are recorded alternately in each track. The multiplexed high speed image search data is recorded at specific positions on a recording medium. The picture ranges of frames are synthesized based on high speed image search data read from the recording medium, to construct a search image in units of frame. Further, a special reproduction transfer rate is set based on a difference between the moving image data transfer rate and the maximum allowable recording transfer rate. Based on the set transfer rate, the special reproduction image data corresponding to the moving image data can be obtained. A recording format is set based on the special reproduction transfer rate. The moving image data, the special reproduction image data and the recording format are multiplexed in accordance with the set recording format. The multiplexed data train is recorded at specific positions on the recording medium. The format of the moving image data and the special reproduction image data is discriminated from the data train read from the recording medium. Further, any of the moving image data and the special reproduction image data are outputted according to the format.

6 Claims, 8 Drawing Sheets

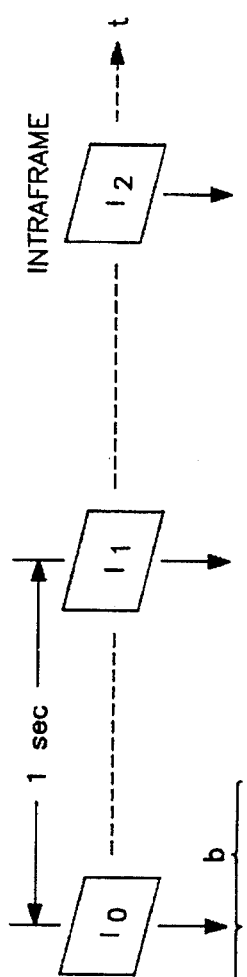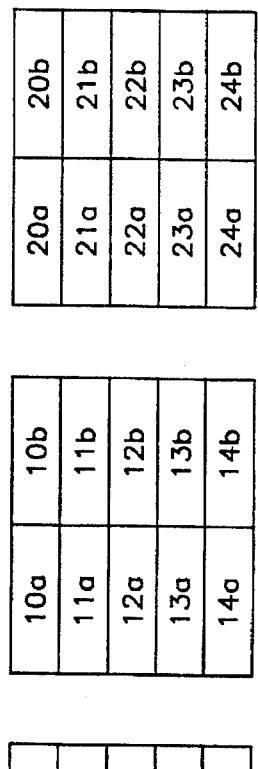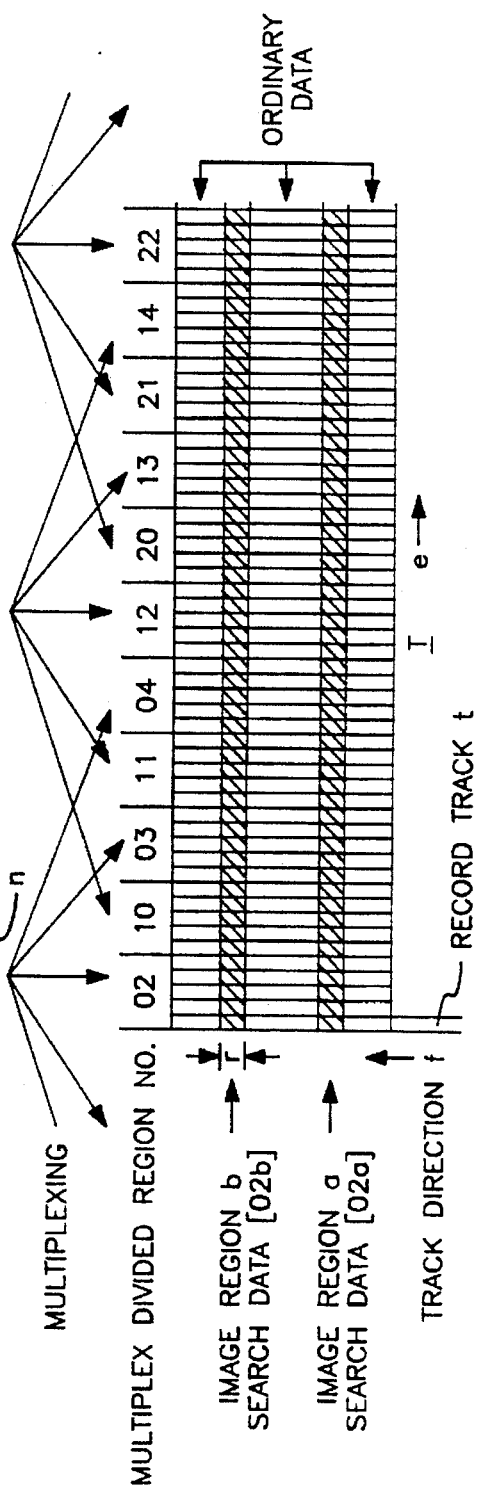
FIG. 2A
FIG. 2B
FIG. 2C

SEARCH AT 5-TIME SPEED

READ RANGES: 02a,02b,10a,10b,03a,03b,11a,11b,04a,04b,12a,12b,20a,20b,...

SEARCH AT 10-TIME SPEED

READ RANGES: 02a,10b,03a,11b,04a,12b,20a,13b,21a,14b,22a,...

SEARCH AT 9-TIME SPEED (2 AZIMUTH HEADS)

READ RANGES: 02a,10b,03a,11b,04a,04b,12a,20b,13a,21b,30a,...
(A,B : TRACKS OF DIFFERENT AZIMUTH ANGLES)

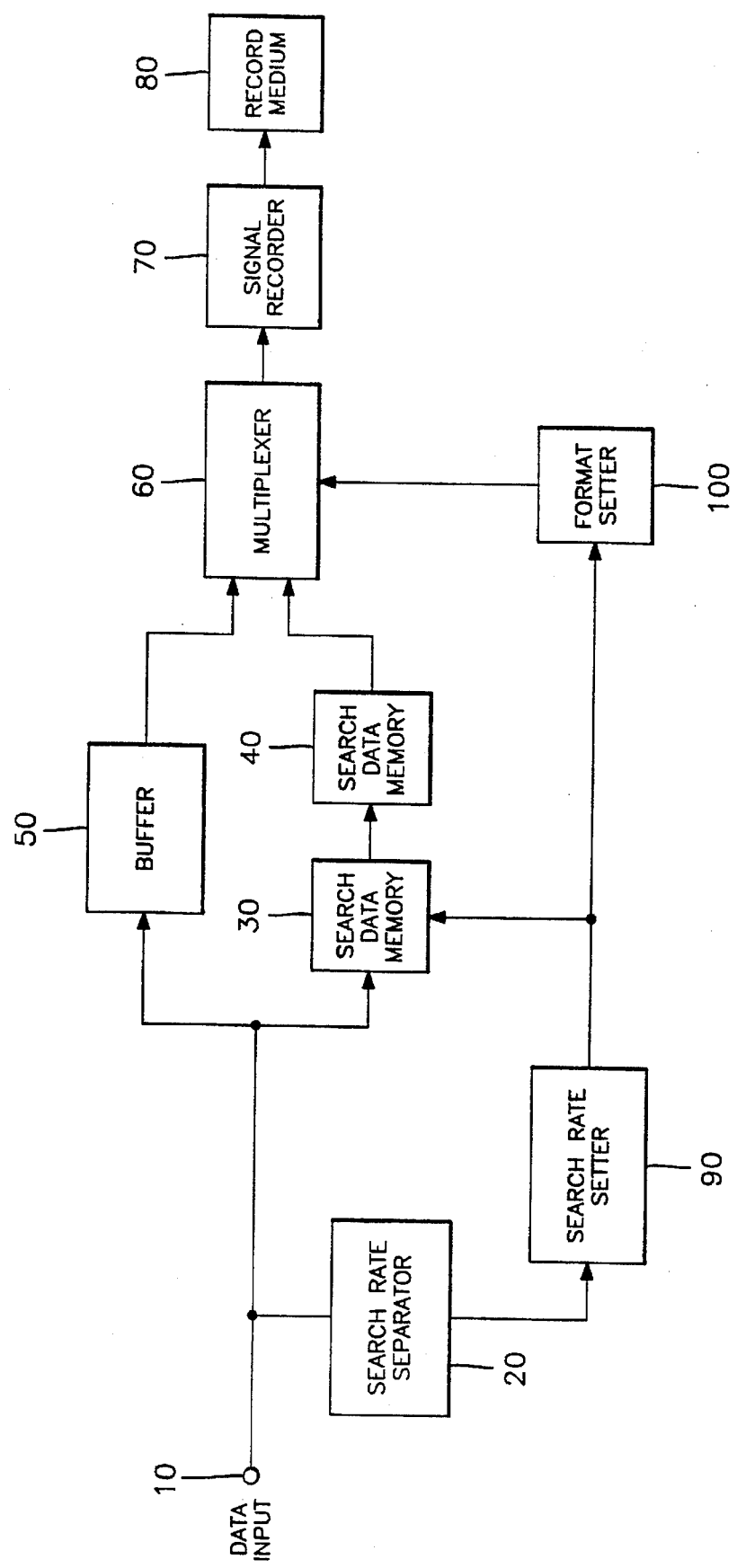

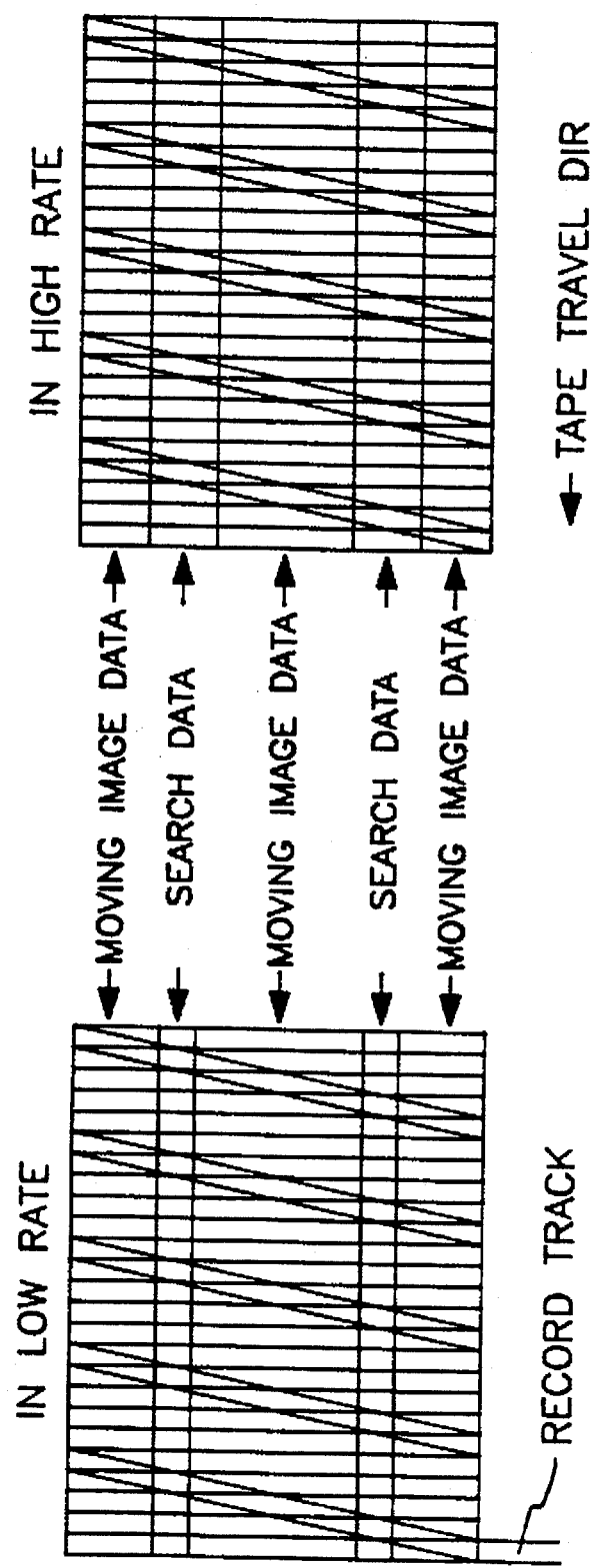

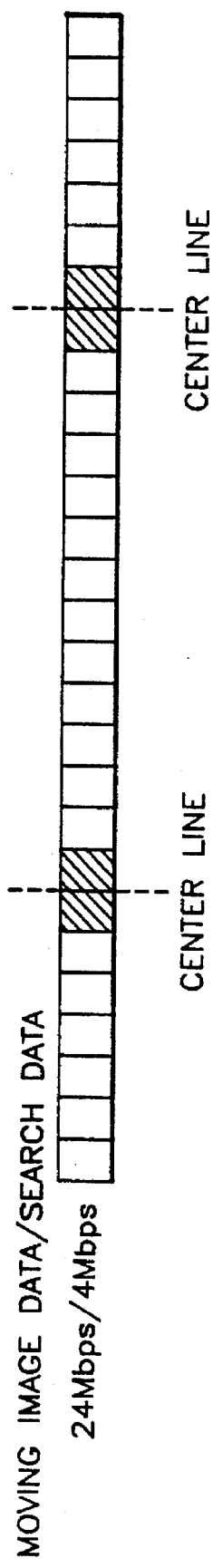
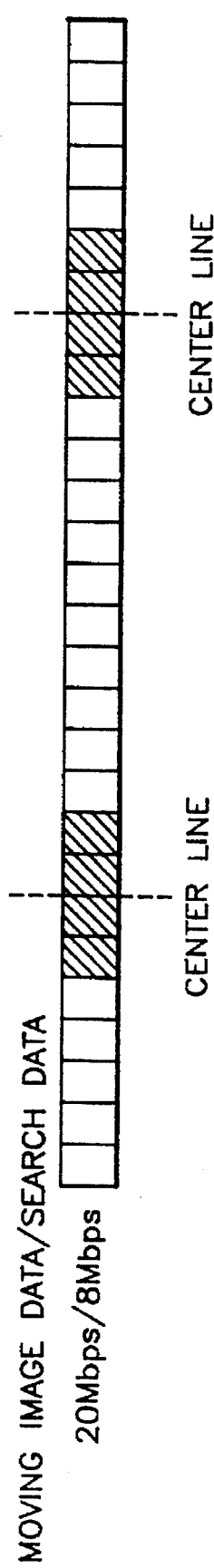
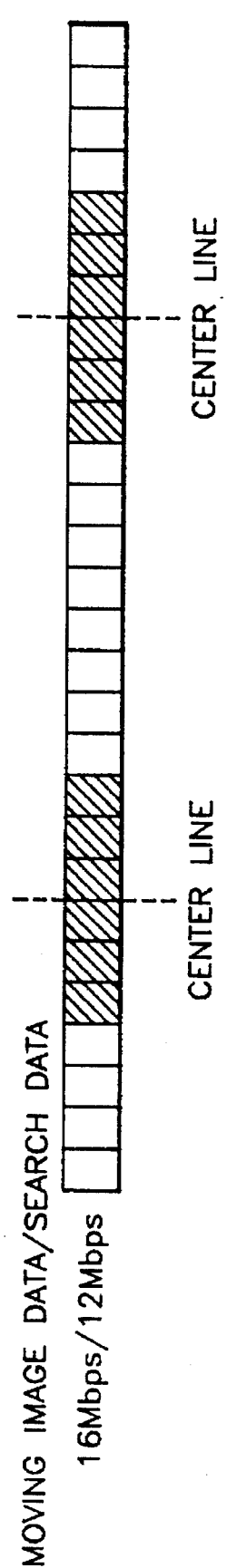

MOVING IMAGE RECORDING AND REPRODUCING APPARATUS

BACKGROUND OF THE INVENTION

1. Field of the Invention

The present invention relates to an apparatus for recording and reproducing compression-coded moving image data to and from a medium (e.g., tape recording medium) such as a digital VTR (video tape recorder), and more specifically to a moving image recording and reproducing apparatus suitable for use in a special reproduction such as high speed image search, for instance.

2. Description of the Prior Art

In the VTR, some special reproductions such as high speed search are often required. In particular, the high speed image search (referred to as high speed search, hereinafter) is essential, by which images can be reproduced at a high speed 5 to 50 times higher than the ordinary (standard) reproduction speed. In the case of the high speed search, since image data recorded by helical scanning are read obliquely along the recording tracks, the image is obtained with partial ommissions. As a result, in the case of an analog VTR, one picture is displayed being divided into several portions.

In the case of the digital VTR, on the other hand, usually the high efficiency coding technique is adopted; that is, image data is compressed in accordance with a variable length coding technique. In this case, since the positions at which image data is recorded on a tape will not synchronize with the positions at which the image data is displayed on the picture, the image data displayed during high speed search fluctuates in position on the displayed picture, so that the obtained picture is extremely hard to see.

To overcome this problem, there has been proposed such a method of recording image data for only the high speed search, wherein the data is recorded separately at predetermined positions on a tape. In this method, high speed search data is recorded at predetermined several positions along the track direction, and the same data is repeatedly recorded over ten tracks, for instance. In this method, if the high speed search is conducted up to ten time speed (a speed ten times higher than the standard tape travel speed), since at least one of the ten tracks can be read without fail, all the data for high speed search can be obtained securely, with the result that it is possible to obtain a high speed search image of perfect frames or fields. Further, in the following description, the high speed search of only frames will be explained in detail.

In this method, however, since the high speed search data recorded on predetermined positions on the tracks becomes large, data for one frame cannot be recorded on one track, so that data for one frame is divided into several units of data. For instance, when data for one frame is divided into ten, the divided data is recorded over the ten tracks. As a result, when recorded repeatedly over the ten tracks as described above, the high speed search data for one frame is recorded over the 100 tracks.

In the conventional method of recording the high speed search data, however, since the same search data must be recorded repeatedly many times (the same as the magnification of the high speed search speed); that is, since the number of repetitions increases with increasing search speed, a great number of tracks are required to record search data for only one frame or one field. As a result, the number of frames for the recorded search image decreases, so that the frames of the reproduced search image tend to become insufficient.

In addition, in the conventional method of recording the high speed search data, since the ranges at which the ordinary reproduction moving image data is recorded and the regions at which the special reproduction (search) data are recorded is both fixed on the tape, the respective recording transfer rates thereof are decided separately. Accordingly, when the transfer rate of the moving image data to be recorded is low, the moving image data is recorded by inserting some blank (stuff) data therebetween. On the other hand, the image data for special reproduction is recorded at a constant transfer rate, irrespective of the transfer rate of the moving image data.

Further, since the image data for the special reproduction (e.g., high speed search) repeatedly must be recorded many times (e.g., the same as the magnification of the high speed search), it is difficult to secure a sufficient transfer rate, with the result that there exists such a problem in that the resolution is lowered and the number of frames of the special reproduction image data decreases.

SUMMARY OF THE INVENTION

With these problems in mind, therefore, it is the object of the present invention to provide a moving image recording and reproducing apparatus, by which the high speed search image can be recorded and reproduced even at a search speed higher than the search speed made available by conventional techniques.

Further, the object of the present invention is to provide a moving image recording and reproducing apparatus, by which the moving image can be recorded and reproduced with a high resolution more smoothly even in the special reproduction (e.g., high speed search).

To achieve the above-mentioned object, the present invention provides an apparatus for recording compression coded moving image data on a recording medium, comprising: means for obtaining high speed image search data from inputted moving image data; means for storing the obtained high speed image search data of a plurality of frames or fields; means for dividing the high speed image search data of each frame or each field into a plurality of ranges on the basis of positions on a picture and further dividing the search data on the basis of the amount of data in each divided range; means for multiplexing the divided high speed image search data, for each position in a picture, in such a way that the search data is recorded at different positions on one track and further a predetermined number of different frames or fields are recorded alternately for each track; and means for recording the multiplexed high speed image search data on predetermined positions of the medium.

Further, the present invention provides an apparatus for reproducing moving image from a medium, wherein high speed moving image search data of a plurality of frames or fields is divided into a plurality of ranges on the basis of positions on a picture and wherein the search data is further divided on the basis of the amount of data in each divided range, further the divided high speed image search data being multiplexed, for each position in a picture, in such a way that the search data is recorded at different positions on one track and further a predetermined number of different frames or fields are recorded alternately for each track, which comprises; means for reading the high speed moving image search data from the medium; and means for forming a search image in units of frame or field by synthesizing data in the picture ranges of a plurality of the frames or the fields on the basis of the read high speed picture search data.

Further, the present invention provides an apparatus for recording moving image data in a recording medium, comprising: transfer rate detecting means for detecting a transfer rate of moving image data to be recorded; transfer rate setting means for setting a transfer rate of special reproduction image data on the basis of a difference obtained by subtracting the detected transfer rate of the moving image data from a maximum allowable transfer rate during recording to the recording medium; special reproduction data forming means for forming special reproduction image data corresponding to the moving image data on the basis of the transfer rate set by said transfer rate setting means; format setting means for setting a recording format on the basis of the set transfer rate of the special reproduction image data, and outputting the set format data; multiplexing means for multiplexing the moving image data and the special reproduction image data and the format data, on the basis of the format data; and signal recording means for recording the multiplexed data train in predetermined positions on the recording medium.

Further, the present invention provides an apparatus for reproducing moving image data recorded on a medium, the moving image data and special reproduction image data corresponding to the moving image data being separately recorded on predetermined adjacent positions on a track at a non-constant ratio in amount of codes of the moving image data to the special reproduction image data both recorded on one track, which comprises: signal reproducing means for reading a data train obtained by multiplexing the moving image data and the special reproduction image data from the recording medium; format discriminating means for separating format data from the data train to discriminate a format of the moving image data and the special reproduction image data; and multiplex separating means for separating the moving image data and the special reproduction image data from the read data in accordance with the format data, and outputting any one of the moving image data and the special reproduction image data.

Further, the present invention provides a method of recording moving image data in a recording medium, comprising the steps of: detecting a transfer rate of moving image data to be recorded; setting a transfer rate of special reproduction image data on the basis of a difference obtained by subtracting the detected transfer rate of the moving image data from a maximum allowable transfer rate during recording to the recording medium; forming special reproduction image data corresponding to the moving image data on the basis of the set transfer rate; setting a recording format on the basis of the set transfer rate of the special reproduction image data, to output the set format data; multiplexing the moving image data and the special reproduction image data and the format data, on the basis of the format data; and recording the multiplexed data train in predetermined positions on the recording medium.

Further, the present invention provides a method of reproducing moving image data recorded on a medium, the moving image data and special reproduction image data corresponding to the moving image data being separately recorded on predetermined adjacent positions on a track at a non-constant ratio in amount of codes of the moving image data to the special reproduction image data both recorded on one track, which comprises the steps of: reading a data train obtained by multiplexing the moving image data and the special reproduction image data from the recording medium; separating format data from the data train to discriminate a format of the moving image data and the special reproduction image data; and separating the moving image data and the special reproduction image data from the read data in accordance with the format data, to output any one of the moving image data and the special reproduction image data.

Further, the present invention provides a recording medium in which recording moving image data and special reproduction image data formed from the moving image data are recorded separately on predetermined adjacent positions on a track of a magnetic tape, wherein a ratio in amount of codes of the moving image data to the special reproduction image data both recorded on one track is changeable, and further the special reproduction image data are recorded in a plurality of different ranges roughly equally divided on one track.

BRIEF DESCRIPTION OF THE DRAWINGS

FIGS. 2A to 2C are illustrations for assistance in explaining the method of recording high speed search data by the apparatus shown in FIG. 1;

FIG. 5 is a block diagram showing a second embodiment of the moving image recording apparatus according to the present invention;

FIGS. 6A and 6B are illustrations showing recording formats of the moving image recording medium related to the present invention;

FIGS. 7A to 7C are illustrations showing the sectors of one track of the moving image recording medium related to the present invention.

DETAILED DESCRIPTION OF THE EMBODIMENTS

The embodiments of the moving image recording and reproducing apparatus according to the present invention will be described in detail hereinbelow with reference to the attached drawings.

Figure 1:
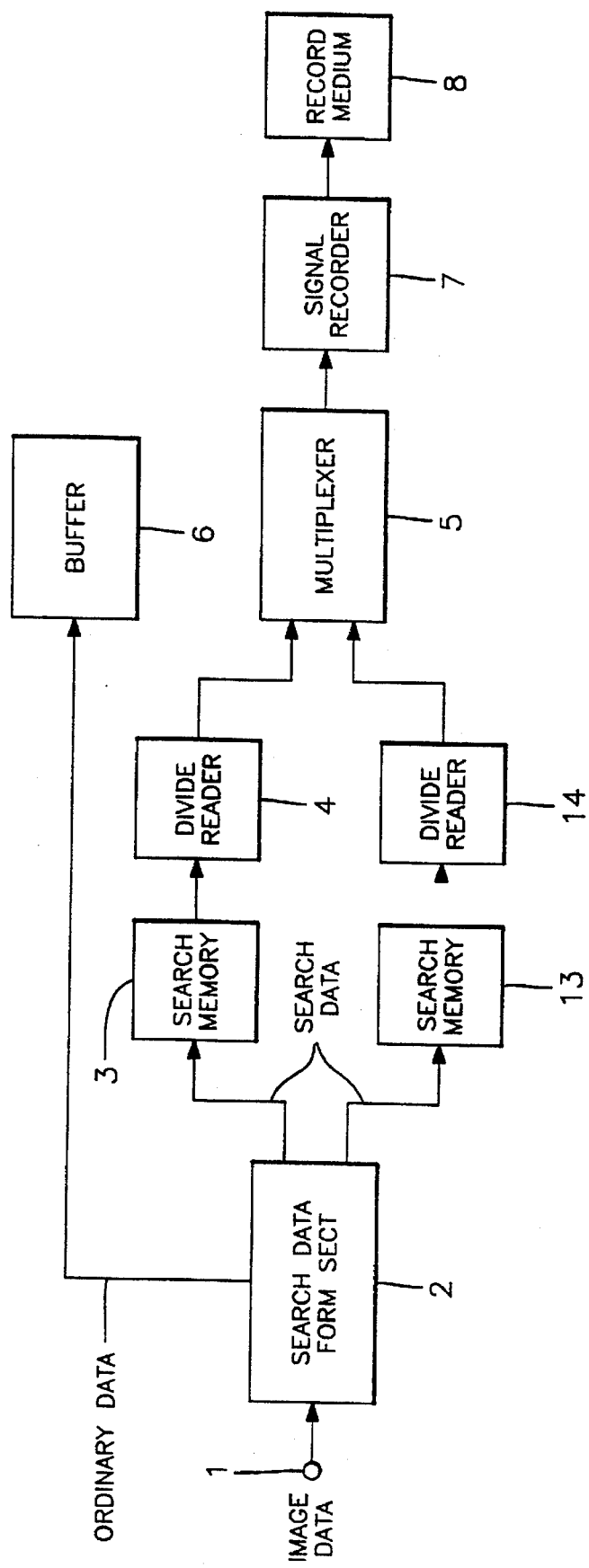
FIG. 1 is a block diagram showing a first embodiment of the moving image recording apparatus according to the present invention.

FIG. 1 shows the construction of a first embodiment of the moving image recording apparatus. FIGS. 2A to 2C show the image signals to be recorded by the moving image recording apparatus shown in FIG. 1, in which FIG. 2A shows the intraframes interposed in the moving image data train so as to be used for high speed search, FIG. 2B shows divided intraframes; and FIG. 2C shows a recording pattern on the tracks of a magnetic tape T. In FIG. 2C, each track t is obtained by finely partitioning the tape T (by fine lines) in the vertical direction of the tape T, and the hatched portion indicates the search data recording positions. Further, data is recorded in sequence in the direction f along the track t but in the direction e along the tape T. Further, in the case of the actual helical scanning, although the actual tracks extend in the oblique direction along the tape, in FIG. 2C the tracks t are shown in the vertical direction f with respect to the direction e of the tape T only for convenience.

The flow of the recorded signal formation will be explained with reference to FIGS. 1 and 2A to 2C. Compression coded image data is inputted through an image data input 1. The image data is interframe image signals prediction-coded between frames and intraframe image signals coded in each frame, for instance. The inputted image signals are given to a search data form section 2. In the search data form section 2, the intraframes are detected. One intraframe is provided for each 10 to 30 frames, and coded independently. One intraframe is usually inserted once for each 0.5 sec. Here, all the intraframes are not read, but recorded only as the high speed search data. In this embodiment, the intraframes are detected for each second, as shown in FIG. 2A.

Further, in the interframe coding, there exists such the case that only a part of the image signals are coded independently (without coding the image signals in units of frames, independently) and the coded image is shifted for each frame. In this case, since the independently coded data for one frame can be obtained by synthesizing the independently coded parts within one period of the shift motion, it is possible to handle the interframe coding in the same way as the intraframe coding. In this case, however, since the time differences occur at the respective parts of the image, the motion is not smooth in the image. However, since this data can be also used as the search data, the intraframes formed as described above are explained as one frame hereinafter.

The recordable amount of search data is read from all the intraframe data. For instance, the DC components of 8×8 pixels are low frequency image data. The search data formed as described above is given to a search memory 3 and a search memory 13 alternately for each frame. The two search memories 3 and 13 have a capacity corresponding to two frames in total so that search data for one frame can be written and read simultaneously.

On the other hand, ordinary reproduction image data to be reproduced is given to a buffer 6. The ordinary reproduction image data is interframe image signals and intraframe image signals both inputted as image data. In the ordinary reproduction image data, although some unnecessary data overlap can be prevented by deleting the contents of the search data, when the search data has been already processed, complicated processing is required. On the other hand, when the amount of overlapped data is not so large in comparison with the total amount of data, the deleting of the overlapped data is not necessarily required.

The recorded data arrangement on a tape will be described hereinbelow, which is one of the features of the present embodiment. The data arrangement is decided by two divide readers 4 and 14 and a multiplexer 5.

As shown in FIG. 2A, the intraframes for providing search data for each second are denoted by $I_0, I_1, I_2, \ldots$. Each intraframe is divided into two regions (a and b) in the horizontal direction by the boundary n on an image. In addition, each of the two-divided regions a and b is further divided into five in the vertical direction, as shown in FIG. 2B.

Here, since the two ranges divided by the boundary n are displayed in a divides manner on the search picture, the position of the boundary n is fixed so that the boundary will not fluctuate on the picture. However, the search picture is not necessarily divided into two. That is, in the intraframe search data, when N frames of different timings (on the time axis) are multiplexed, each intraframe is divided into a number larger than N.

On the other hand, the range a or b is divided into five in the vertical direction in such a way that the amount of data in each divided range becomes equal to the amount of search data recorded on the track (that is, the range is not divided so as to equalize the respective areas on the picture). In this embodiment, since the search data is determined to be DC components of fixed length codes, the amount of data is fixedly divided equally. In the case shown in FIG. 2B, each range a or b is divided into five in the vertical direction. In this division, since the search data for one frame (in the two divided ranges a and b) cannot be recorded at the search data recording position on the one track, the search data for one frame is divided and recorded over a plurality of tracks.

Each range of a frame is denoted by three digits as [02b], in which the head leftmost digit designates a frame number 0 -), the middle digit designates the vertical division numbers (0 to 4 ), and the rightmost digit designates the horizontal position (right and left side a and b) divided by the boundary n.

On the other hand, the divided search data is recorded at two different positions along one track of the tape, as shown by the oblique lines on the tape T or the portions enclosed by thick lines in FIG. 2C. The number of divisions of the recording positions is two in FIG. 2C. However, the number of divisions is determined to be equal to the number of frames to be multiplexed, that is, the number of displays divided on the search picture, which is also equal to the number of divisions N by the boundary n (N=2, in the case of two divisions).

Further, the record length r of the respective search data is determined short enough to such a degree that all the data can be read continuously when the tracks are read obliquely at the maximum search speed. Further, the image data for the ordinary reproduction is recorded at positions other than those for recording the search data.

Further, the search data is arranged on each track t as follows: (1) the same data at the respective range is repeatedly recorded over the five tracks; (2) data in the horizontal division range a (on the left side in FIG. 2B) is recorded beginning from the lower portion in sequence so that data in the horizontal division range b (on the right side) is recorded on the upper side of the respective range; and (3) data is arranged in the vertical divisions in such a way that two frames (different timing on the time axis) are arranged alternately for each five tracks. In other words, the divided data is arranged as: the divided range data of the frame $I_0 \rightarrow$ the divided range data of the frame $I_1 \rightarrow$ the divided range data of the frame $I_0 \rightarrow$ the divided range data of the frame $I_1 \rightarrow$ the divided range data of the frame $I_0 \rightarrow$ the divided range data of the frame $I_1 \rightarrow$ the divided range data of the frame $I_2 \rightarrow$ the divided frame data of the range $I_1 \rightarrow$ the divided range data of the frame $I_2 \rightarrow$ the divided range data of the frame $I_1 \rightarrow$ the divided range data of the frame $I_2$. That is, as shown in FIG. 2C, the heads of the numbers of division ranges indicative of the frame numbers are arranged as $0 \rightarrow 1 \rightarrow 0 \rightarrow 1, \ldots$.

Therefore, the search data is arranged for each five tracks beginning from the left lower end in the order of [02a] on the lower side, [02b] on the upper side, [10a] and [10b], [03a] and [03b], ..., as shown in FIG. 2C.

Therefore, in the recording apparatus shown in FIG. 1, the search data is read in the above-mentioned division order in such a way that the search data of the frame $I_0$ recorded in the search memory 3 is read by the divide reader 4; the search data of the frame $I_1$ recorded in the search memory 13 is read by the divide reader 14. The read search data is given to the multiplexer 5. The multiplexer 5 multiplexes the search data of the frame $I_0$ and $I_1$ and the ordinary reproduction image data using a time division multiplex method. Here, the same search data is read five times and then multiplexed.

As described above, the multiplexer 32 forms a data stream by switching the ordinary reproduction image data to the high speed search data or vice versa. The formed data stream is given to a signal recorder 7.

Here, when the transfer rate of the moving image data to be recorded is lower than the recording transfer rate, stuff data (invalid data) is inserted to equalize the virtual transfer rate to the recording transfer rate.

The signal recorder 7 records the data stream in a recording medium 8 as moving image data, by adding error correction codes to the data stream and by modulating the data stream into image signals suitable for the recording medium 8. The recording medium 8 is a video tape, for instance, in which high speed search data is recorded at special portion of the tracks and the ordinary reproduction image data is recorded on the other remaining portions on the tracks.

When data is recorded on the tape using two heads having two different azimuth angles, respectively, the data cannot be read when the azimuth angles of the tracks do not match the azimuth angles of the heads. To overcome this problem, in practice, the data is divided for each track of the same azimuth angle, and the data is recorded repeatedly on the tracks of the same azimuth angles.

Further, the search data can be recorded only on the tracks of one of the two azimuth angles, and read using one of the heads of the same azimuth angle.

Figure 3:
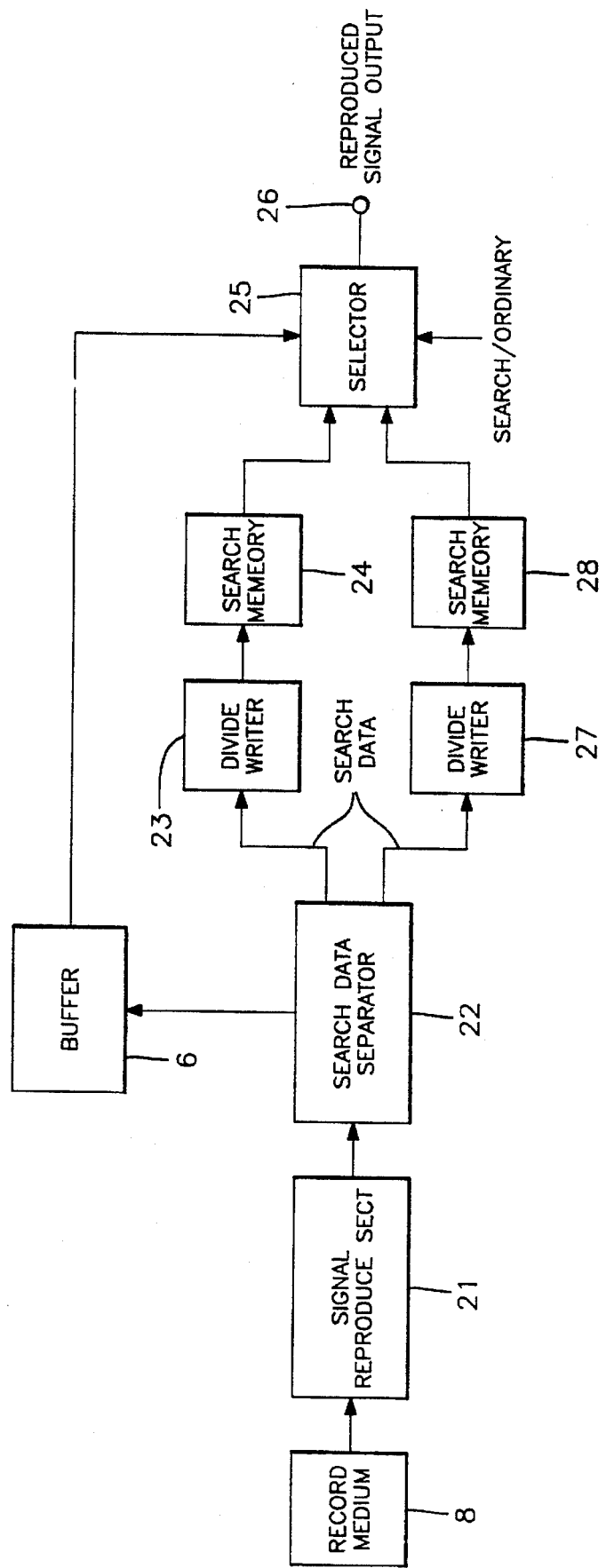
FIG. 3 is a block diagram showing a first embodiment of the moving image reproducing apparatus according to the present invention.
Figure 4A:
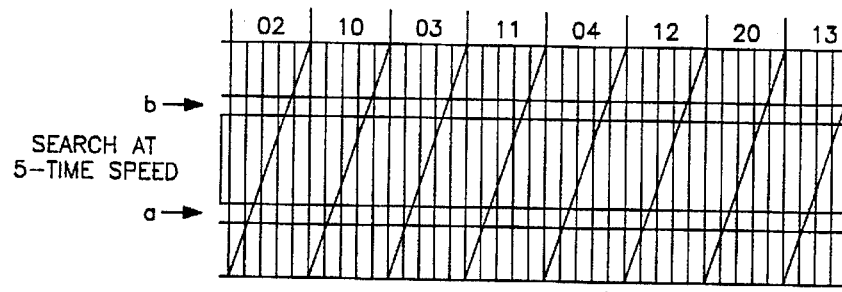
FIGS. 4A to 4C are illustrations for assistance in explaining the method of reproducing high speed search data by the apparatus shown in FIG. 3.
Figure 4B:
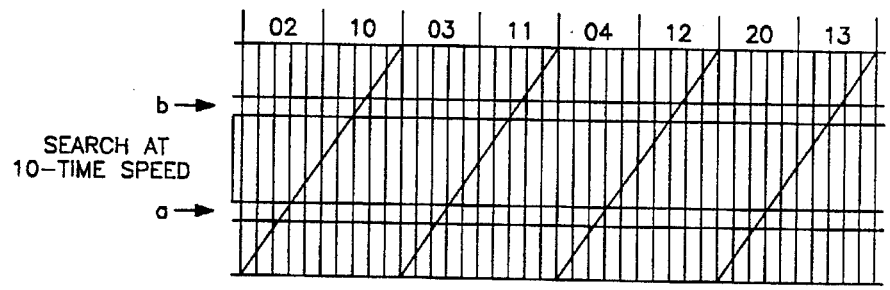
Figure 4C:
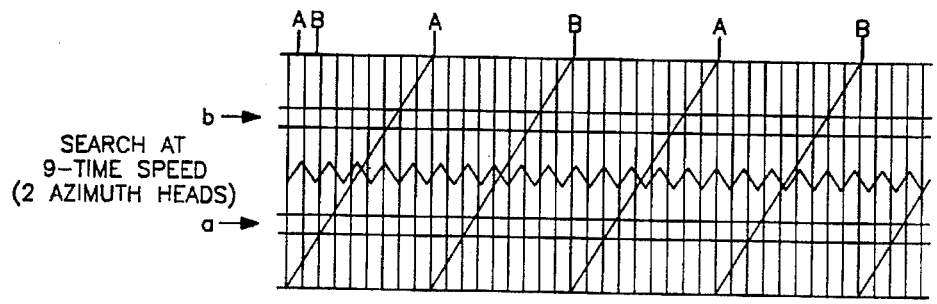

FIG. 3 is a block diagram showing the construction of the first embodiment of the reproducing apparatus, and FIGS. 4A to 4C are illustrations for assistance in explaining the reproduction states during a high speed search.

As shown in FIG. 3, image signals read from the recording medium 8 are modulated and error-corrected by a signal reproduce section 21. The demodulated signals are outputted as a data stream to a search data separator 22. The search data separator 22 discriminates the search data on the basis of the sector numbers inserted periodically, and separates only the discriminated search data. The separated search data is divided for each frame in such a way that the first frame (e.g., $I_0$) is given to a divide writer 23 and the second frame (e.g., $I_1$) is given to a divide writer 27. The divide writers 23 and 27 discriminate the positions of the divided search data and record the discriminated positions in search memories 24 and 28, respectively.

A selector 25 selects the output of a buffer 6 during the ordinary reproduction but the output of the memories 24 and 28 during the high speed search. The selected outputs are given to a reproduce output 26. The respective data outputted from the reproduce output 26 are decoded by a decoder arranged in a TV set and then displayed as a reproduced picture.

In the case where the search magnification is five times or less, even if the read tracks change as shown in FIG. 4A, since the same data is repeatedly recorded in this case, it is possible to obtain all the search data. In more detail, the readable ranges are 02a, 02b, 10a, 10b, 03a, 03b, 11a, 11b, 04a, 04b, 12a, 12b, 20a, 20b, . . . Further, as already explained, the same data is repeatedly recorded over the five tracks.

Therefore, whenever data for one frame has been obtained, each of the search memories 24 and 28 outputs the obtained data for one frame as search data. Since the frames $I_0$ and $I_1$ are recorded at different timing, reproduced image signals are outputted from the memories 24 and 28, alternately. Further, since the intraframes are included for each second and reproduced at five-time speed (five times higher than the standard speed), it is possible to obtain search images of five frames per second.

Here, it is also possible to use the respective memories only for the horizontal division range a or b, without allocating the respective memories to one frame. In this case, the search memory 24 records only data in the horizontal range a and the search memory 28 records only data in the horizontal range b, without recording the other horizontal range. Further, when only the data in one of the horizontal ranges is read from each of the memories 24 and 28, separately, although the right and left frames are different from each other in timing, it is possible to obtain the search image in the form of a full picture. Further, in this case, the capacity of each of the search memories 24 and 28 can be reduced by a half.

In the case of ten time speed (an advantageous point of the present embodiment), search data is read over ten tracks as shown in FIG. 4B. In this case, although it is impossible to obtain both the data of the horizontal divided ranges a and b in the vertical divided range, since the multiplexing period is synchronized with the data reading period, it is possible to obtain all the vertical divided data of either one of the horizontal divided range a or b. In other words, since search data is multiplex-recorded at a ten-track period for each five tracks in such a way that the two frames different in timing are inserted alternately, when the search data is read at ten-time speed for each ten tracks, it is possible to obtain either one of all the data of the horizontal divided range a or b.

Further, since the search data is divided in the track direction f and recorded in such a way that data of the horizontal division range a is recorded at a lower position and the horizontal division range b is recorded at an upper position, if one of the frames recorded alternately is the horizontal division range a at the ten time speed, the other of the frames is the horizontal division range b, with the result that it is possible to obtain the search image for one picture using two frames in total.

In other words, the read ranges are 02a, 10b, 03a, 11b, 04a, 12b, 20a, 13b, 21a, 14b, 22a, . . . Therefore, it is possible to obtain the search image in the form of a full picture, although the frames are different from each other in timing on both sides. In other words, it is possible to obtain all the data in the horizontal division range a (on the right side) of the frame $I_0$ and all the data in the horizontal division range b (on the left side) of the frame $I_1$, so that it is possible to obtain the search image the same as with the case where the memory capacity is half at the five time speed. However, since the speed is two times higher, the number of frames per second is doubled as compared with that at the five time speed.

In the present embodiment, the two-division recording corresponds to the twice speed of the conventional apparatus. Here, when the N-division recording is made by increasing the number of frames and the number of divided displays (the number of horizontal divisions in picture in the embodiment) in the search picture, this corresponds to N-time speed. In this case, the search data is recorded at N positions in the track direction f, and the N different frames are multiplexed and recorded at a period repeated in order. For instance, in the case where the three-division recording corresponds to the conventional three time speed, the respective ranges of the intraframes $I_0$, $I_1$, and $I_2$ are multiplex-recorded in the order of the divided range data of the frame $I_0$ → the divided range data of the frame $I_1$ → the divided range data of the frame $I_2$ → the divided range data of the frame $I_0$ →, . . .

Further, in the case of the N division recording, even if N is a number dividable by the multiple time speed (e.g., if N is six, two or three time speed), since the data reading period synchronizes with the multiplexing period, it is possible to obtain an excellent search image.

Further, in the present embodiment, although the picture is divided in the horizontal direction, it is possible to divide the picture in both the vertical and horizontal directions in combination, as far as the picture is not hard to see. Further, the search data is divided in the vertical direction, and it is possible to divide the search data in other ways.

When data is recorded on a tape using two heads having different azimuth angles, the search speed is restricted due to the relationship between the track azimuth angle and the head azimuth angle. For instance, in the case of ten time speed, since the track azimuth angles does not match one of the head azimuth angle, data can be read by only one head.

In this case, however, as shown in FIG. 4C, data can be read using the two heads at nine time speed. The read ranges at the nine time speed are 02a, 10b, 03a, 11b, 04a, 04b, 12a, 20b, 13a, 21b, 30a, . . . In this case, however since the multiplexing period does not synchronize with the reading period, the picture division ranges (a/b) do not synchronize with the frames, so that the frames change according to the vertical divisions. As a result, in a picture bisected in both the horizontal and vertical directions, the divided points are shifted for each frame, so that the picture is difficult to see as compared with the case of the ten time speed. However, it is possible to use this method as the search image.

Further, when data is recorded on the tracks of only one of the azimuth angles, although the speed is restricted, since the multiplexing period can be synchronized with the reading period, excellent search images can be obtained.

FIG. 5 shows a second embodiment of the moving image recording apparatus according to the present invention. Moving image data inputted through a data input 1 is inputted to a buffer 50, a search data form section 30, and a rate data separator 20. Here, the moving image data is compressed by high efficiency coding on the basis of the interframe prediction. On the other hand, the ordinary reproduction moving image data in the ordinary reproduction is stored in the buffer 50 so that the data can be read discontinuously during the multiplexing operation. In other words, when the multiplexer 60 reads data from the search memory 40, data in the buffer 50 is kept stored without being read by the multiplexer 60. In the rate data separator 20, the moving image data to be recorded is analyzed, and the transfer rate data of each data train is separated from the header portion thereof. The separated transfer data is given to the search rate setter 90.

In the search rate header 90, the moving image transfer rate is subtracted from the total recordable transfer rate to calculate a vacant transfer rate usable for the search data.

Here, the total recordable transfer rate implies the maximum total transfer rate recordable in the recording medium. Further, the value obtained by dividing the vacant transfer rate by the number of repetitive search data recording times becomes the search data transfer rate. The obtained search data transfer rate is given to a search data form section 30 and a format setter 100.

Here, the number of the repetitive search data recording times is previously determined according to the maximum search speed. For instance, when the maximum search speed is a five time sped, the number of the repetitive recording times is five times. Further, the transfer rate value determined for the special reproduction image data does not change continuously, because the recording format is changed in units of sector, as described later. That is, the transfer rate thereof changes a constant time of the number of sectors to which search data is allocated in one track.

In the search data form section 30, the moving image data is analyzed, and only the independent image coded by the image data in a frame is detected. Here, the independent image includes not only the independent image (one frame) in units of frame, but also such a case that in the coding by use of the interframe prediction, only a part of the image is coded independently and further the coded part is shifted for each frame.

In the case of the independent image as described above, since the independent image data for one frame can be obtained by synthesizing the partial independent image during one shift period, it is possible to handle this case in the same way as with the case of the intraframe. In this case, since the partial independent images differ from each other in timing, when the image moves, although the partial independent images become discontinuous, the intraframe formed as described above will be explained by assuming this case to be one frame.

The amount of the search data corresponding to the search data transfer rate determined by the search data setter 90 is read from all the intraframe data. Although the intraframe is usually inserted once for 0.5 sec, not all the data in the intraframe is used, that is, the data is omitted partially according to the transfer rate. In addition, the data is omitted spatially. That is, only the DC components of 8×8 DCT or AC coefficients corresponding to a low frequency are used according to the determined transfer rate.

The search data formed by the search data form section 30 is given to the search data memory 40, and the search data for one track is stored in the search data memory 40. Therefore, the capacity corresponding to the maximum search data for one track is required for the search data memory 40. search rate setter 90. The decided format data is given to the multiplexer 60.

In the multiplexer 60, in accordance with the format data given by the format setter 100, the moving image data stored in the buffer 50 and the search data recorded in the search data memory 40 are multiplexed in time division in sector unit (several ten byte to several hundred bytes). The formed recorded data train is given to a signal recorder 70. Here, in the case of the five time speed, the same search data is read five times for multiplex.

In the signal recorder 70, the data train formed as described above is modulated and further coded for error correction, and then recorded on the recording medium 80.

The actual recording arrangement (format) on the tape will be described hereinbelow with reference to FIGS. 6A and 6B, in which each track is partitioned by fine lines in the vertical directions and search data recording positions are enclosed by thick lines. Further, in the case of helical scanning, although the actual tracks are oblique with respect to the tape direction, the tracks are shown vertically for only convenience. Further, the head scanning direction at the special reproduction (e.g., five time speed) is shown by oblique lines with respect to the track.

FIG. 6A shows the case where the transfer rate of the moving image data is high but the transfer rate of the search data is slow, and FIG. 6B shows the case where the transfer rate of the moving image data is low but the transfer rate of the search data is high.

The search data recording positions on the tape are two predetermined ranges on the tracks. The amount of the search data is large in the case shown in FIG. 6B, as compared with that shown in FIG. 6A. However, the continuous recording length of the search data on one track is determined to such an extent that all the search data can be read continuously even if data is read obliquely along the track during a high speed search.

FIGS. 7A to 7C show the status where the moving image data is stored in the sectors on one track of the recording medium, in which one track is enlarged and one partition represents one sector. The recording ranges of the moving image data and the search data change in units of sector. The search data range shown by the oblique lines increases or decreases roughly symmetrically with respect to the central position thereof.

In FIGS. 7A to 7C, one track has 28 sectors. Here, if the total transfer rate of the moving image data and the search data is 28M bps, in the case of FIG. 7A, four sectors are used for the search data, so that the transfer rate of the moving image data is 24M bps and that of the search data is 4M bps. In the same way, the transfer rates of the moving image and the search data are 20 and 8M bps in the case shown in FIG. 7B and 16 and 12M bps in the case shown in FIG. 7C, respectively.

If the moving image data to be coded is 18M bps, for instance, the recording format as shown in FIG. 7B is selected, and the stuff data of 2M bps is inserted into the moving image data.

When the number of sectors per track further increases, since the transfer rate can be switched more finely, it is possible to reduce the amount of stuff data to be inserted.

Further, in FIGS. 6A to 7C, although two search data recording ranges are shown on one track. The number of the search data recording ranges is not limited to only two. That is, even if the number of the search data recording ranges is three or more, this does not depart from the gist of the moving image data recording medium of the present invention.

Figure 8:
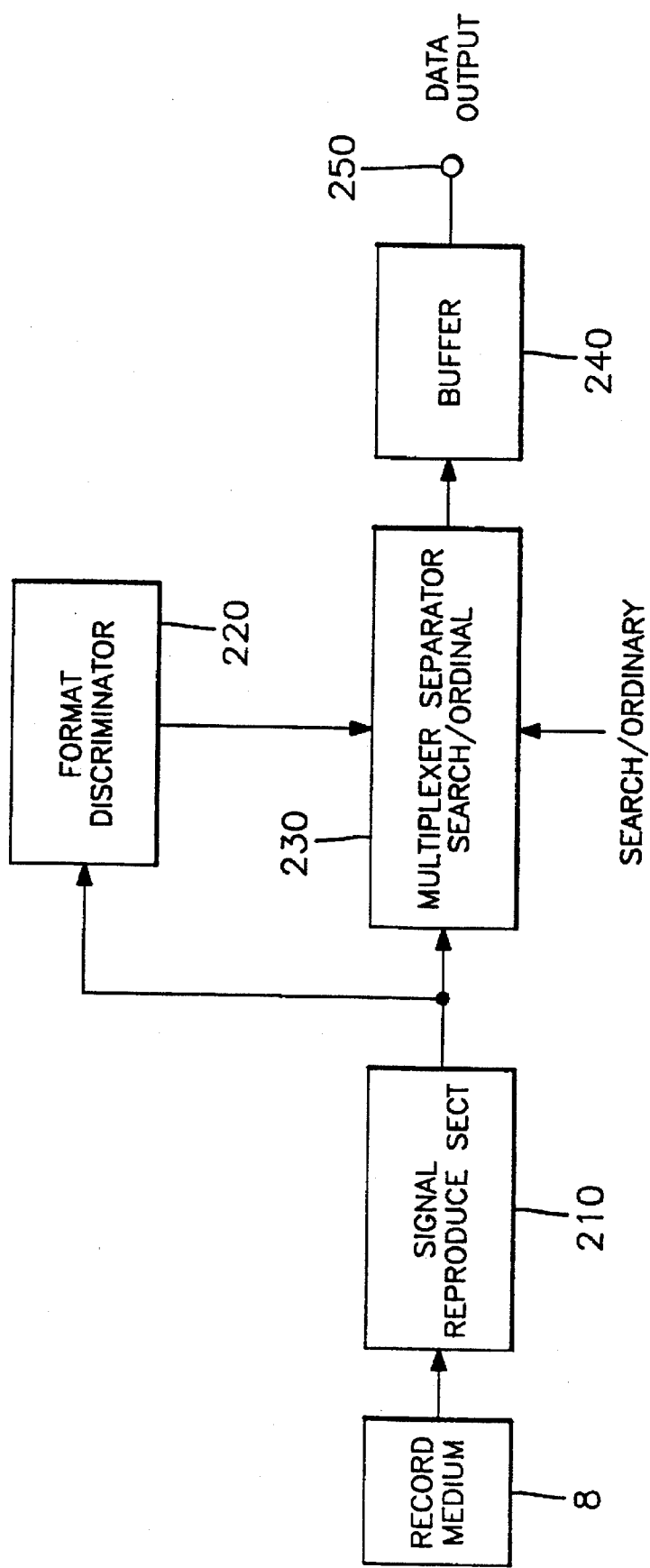
FIG. 8 is a block diagram showing a second embodiment of the moving image reproducing apparatus according to the present invention.

FIG. 8 shows the second embodiment of the moving image reproducing apparatus according to the present invention.

In a signal reproduce section 210, image signals read from the recording medium 80 are demodulated and further coded for error correction into a data train. The formed data train is given to a format discriminator 220 and a multiplexer 230. In the format discriminator 220, the format data multiplexed into the data train is detected to recognize to which selectors the moving image data and the search data are allocated.

In the multiplexer 230, the moving image data and the search data are discriminated on the basis of the format data and the sector numbers each inserted into the sector header, and any one of the data is separated and then outputted. The respective data is given to the buffer 240 to absorb the discontinuity of the data train due to the data separation. The data of the buffer 240 is outputted as the reproduction data from an data output 25.

As described above, in the present invention, since the recording positions on the track are changed according to the portions of the image, since a plurality of frames are multiplexed to record the high speed image search data, and since the divided image data is synthesized during the reproduction for display, it is possible to obtain a reproduced image at a high search speed which is higher than the conventionally possible search speed.

As a result, the search image can be recorded and reproduced at a higher search speed, without reducing the number of frames per second. In contrast, when the search speed is set to the same as that of the conventional apparatus, since the number of repetitive recordings can be reduced, that is, since a larger number of the search frames can be recorded, it is possible to obtain a search image whose motion is more smooth.

Further, according to the present invention, when the ordinary reproduction moving image data and the special reproduction image data are recorded, the proportion of the ordinary reproduction moving image data to the special reproduction image data is changed on the recording format according to the transfer rate of the moving image data to be recorded. That is, when the transfer rate of the ordinary reproduction moving image data is low, the transfer rate of the special reproduction image data is increased. Therefore, it is possible to insert the special reproduction image data into the portions where blank (stuff) data have been so far inserted in the conventional method, with the result that the resolution and the frame rate of the special reproduction image can be increased. As a result, it is possible to obtain a search picture of a high resolution and a smoother motion, without increasing the recording transfer rate.

Further, according to the present invention, the special reproduction image data is divided roughly uniformly and arranged at a plurality of ranges on a track, and further the respective range lengths for the special reproduction image data can be modified. Therefore, the central positions of the respective ranges of the special reproduction image data can be fixed, and further the special reproduction image data is recorded in the vicinity of the central positions, respectively. As a result, even if the read head is scanned obliquely along the recording tracks during the special reproduction, it is possible to easily read all the special reproduction image data.

Further, according to the present invention, the recording format data of the ordinary reproduction moving image data and the special reproduction image data can be discriminated during the reproduction. Therefore, even if the transfer rate of the special reproduction image data is changed, it is possible to obtain all the special reproduction image data, so that it is possible to obtain a high speed reproduced search picture having a high resolution and a smoother motion.

Furthermore, according to the present invention, the special reproduction image data is divided roughly uniformly and recorded at a plurality of ranges on each track of the recording tape. Further, the respective range lengths of the special reproduction image data are changed according to the proportion of the ordinary reproduction moving image data to the special reproduction image data on the recording format. As a result, it is possible to effectively record both the ordinary reproduction moving image data and the special reproduction image data by reducing the invalid data, so that the resolution and the smoothness of the reproduced moving picture can be both improved.

What is claimed is:

1. An apparatus for recording moving image data in a recording medium, comprising:
   transfer rate detecting means for detecting a transfer rate of moving image data to be recorded;
   transfer rate setting means for setting a transfer rate of special reproduction image data on the basis of a difference obtained by subtracting the detected transfer rate of the moving image data from a maximum allowable transfer rate during recording to the recording medium;
   special reproduction data forming means for forming special reproduction image data corresponding to the moving image data on the basis of the transfer rate set by said transfer rate setting means;

format setting means for setting a recording format on the basis of the set transfer rate of the special reproduction image data, and outputting the set format data;

multiplexing means for multiplexing the moving image data and the special reproduction image data and the format data, on the basis of the format data; and signal recording means for recording the multiplexed data train in predetermined positions on the recording medium.

2. The apparatus for recording moving image data in a recording medium of claim 1, wherein the moving image recording medium is a magnetic tape and wherein when the special reproduction image data are recorded in a plurality of ranges divided roughly equally on one track, said format setting means sets the recording format by changing a recording range length of the respective special reproduction image data to be recorded dividedly according to the transfer rate of the special reproduction image data.

3. A method of recording moving image data in a recording medium, comprising the steps of:

detecting a transfer rate of moving image data to be recorded;

setting a transfer rate of special reproduction image data on the basis of a difference obtained by subtracting the detected transfer rate of the moving image data from a maximum allowable transfer rate during recording to the recording medium;

forming special reproduction image data corresponding to the moving image data on the basis of the set transfer rate;

setting a recording format on the basis of the set transfer rate of the special reproduction image data, to output the set format data;

multiplexing the moving image data and the special reproduction image data and the format data, on the basis of the format data; and recording the multiplexed data train in predetermined positions on the recording medium.

4. The method of recording image data in a recording medium of claim 3, wherein the moving image recording medium is a magnetic tape and wherein when the special reproduction image data are recorded in a plurality of ranges divided roughly equally on one track; and in the step of setting the recording format, a recording range length of the respective special reproduction image data to be recorded dividedly are changed according to the transfer rate of the special reproduction image data to set the recording format.

5. A recorded medium comprising:

a moving image data recorded on one track of a magnetic tape; and a special reproduction image data formed from the moving image data and recorded separately from the moving image data over predetermined adjacent positions on the track under a ratio in amount of codes of the moving image data to the special reproduction image data, wherein the ratio in amount changes along the recorded medium depending on an amount of the codes of the moving image data, the special reproduction image data being recorded over a plurality of different ranges substantially equally divided on the track.

6. A recorded medium according to claim 5, wherein the special reproduction image data is formed with a first transfer rate decided based on a difference obtained by subtracting a second transfer rate of the moving image data from a maximum transfer rate during recording to the medium, and the moving image data and the special reproduction image data are multiplexed with each other in accordance with a recording format decided based on the first transfer rate.

* * * * *